(12) United States Patent
Koyama et al.

(10) Patent No.: US 10,745,632 B2
(45) Date of Patent: Aug. 18, 2020

(54) SLAG DISCHARGE SYSTEM AND GASIFIER

(71) Applicant: MITSUBISHI HITACHI POWER SYSTEMS, LTD., Yokohama-shi, Kanagawa (JP)

(72) Inventors: Yoshinori Koyama, Tokyo (JP); Masato Murayama, Kanagawa (JP)

(73) Assignee: MITSUBISHI HITACHI POWER SYSTEMS, LTD., Yokohama-shi, Kanagawa (JP)

(\*) Notice: Subject to any disclaimer, the term of this patent is extended or adjusted under 35 U.S.C. 154(b) by 63 days.

(21) Appl. No.: 16/060,740

(22) PCT Filed: Sep. 8, 2016

(86) PCT No.: PCT/JP2016/076465
§ 371 (c)(1),
(2) Date: Jun. 8, 2018

(87) PCT Pub. No.: WO2017/130453
PCT Pub. Date: Aug. 3, 2017

(65) Prior Publication Data
US 2018/0362869 A1    Dec. 20, 2018

(30) Foreign Application Priority Data
Jan. 27, 2016    (JP) ................. 2016-013350

(51) Int. Cl.
*C10J 3/52*    (2006.01)
*C10J 3/46*    (2006.01)
(Continued)

(52) U.S. Cl.
CPC ............ *C10J 3/526* (2013.01); *C10J 3/466* (2013.01); *C10J 3/485* (2013.01); *C10J 3/72* (2013.01);
(Continued)

(58) Field of Classification Search
CPC ....................................................... C10J 3/526
See application file for complete search history.

(56) References Cited

U.S. PATENT DOCUMENTS

| | | |
|---|---|---|
| 2012/0196241 A1 | 8/2012 | Koyama et al. |
| 2014/0237986 A1 | 8/2014 | Tazawa et al. |
| 2017/0130148 A1* | 5/2017 | Lau .................. F23C 10/24 |

FOREIGN PATENT DOCUMENTS

| | | |
|---|---|---|
| EP | 2485001 A1 | 8/2012 |
| JP | 53-14704 A | 2/1978 |

(Continued)

OTHER PUBLICATIONS

International Search Report dated Oct. 25, 2016, issued in counterpart International Application No. PCT/JP2016/076465, with English translation. (3 pages).

(Continued)

*Primary Examiner* — Matthew J Merkling
(74) *Attorney, Agent, or Firm* — Westerman, Hattori, Daniels & Adrian, LLP

(57) ABSTRACT

This slag discharge system (1) includes: a slag hopper (5) of a coal gasifier (2); a slag discharge line (7) that discharges a mixture of slag and slag water (W); a slag separation device (10) that separates the slag from the mixture of slag and slag water (W); a circulation pump (24) that forms a water flow from the slag hopper (5) to the slag separation device (10) in the slag discharge line (7); a lock hopper (14) that stores slag which has been separated at the slag separation device (10) and discharges the same out of the coal gasifier (2) system; a slag discharge valve (15) that is provided on a lower outlet of the lock hopper (14); and a slag water return flow line (20) for returning the slag water (W) which has been separated at the slag separation device (10) to the slag hopper.

6 Claims, 4 Drawing Sheets

(51) Int. Cl.
    *C10J 3/48*         (2006.01)
    *C10J 3/72*         (2006.01)

(52) U.S. Cl.
    CPC ...... *C10J 2200/152* (2013.01); *C10J 2200/36* (2013.01); *C10J 2300/093* (2013.01); *C10J 2300/169* (2013.01); *C10J 2300/1807* (2013.01); *Y02E 20/18* (2013.01)

(56) References Cited

FOREIGN PATENT DOCUMENTS

| | | |
|---|---|---|
| JP | 2000-288523 A | 10/2000 |
| JP | 2011-74274 A | 4/2011 |
| JP | 2013-56972 A | 3/2013 |
| JP | 2013-82830 A | 5/2013 |
| JP | 5743093 B2 | 7/2015 |
| JP | 2016-13350 A | 1/2016 |

OTHER PUBLICATIONS

Written Opinion dated Oct. 25, 2016, issued in counterpart International Application No. PCT/JP2016/076465, with English translation. (9 pages).

* cited by examiner

SLAG DISCHARGE SYSTEM AND GASIFIER

TECHNICAL FIELD

The present invention relates to a slag discharge system of a gasifier for pyrolyzing and gasifying carbonaceous feedstock such as coal and a gasifier having the slag discharge system.

BACKGROUND ART

In a gasifier which generates combustible gas by pyrolyzing a biomass fuel such as coal and woody pellets or carbonaceous feedstock such as pet cork, ashes of the carbonaceous feedstock is melted and is accumulated in a slag hopper, which is provided in a bottom portion of the gasifier, as slag. Slag water (cooling water) is stored in the slag hopper, and the slag falls into the slag water, is rapidly cooled to be solidified and crushed.

In this way, the slag which is solidified, crushed, and stored in the slag hopper is discharged out of a system of the gasifier via a lock hopper which is provided outside the gasifier. Since the slag has a higher density than the slag water, in the related art, when the slag is moved from the slag hopper to the lock hopper, the slag falls naturally by gravity. For example, PTL 1 discloses a slag discharge system in which a lock hopper is disposed on a lower portion of a gasifier.

However, according to the above-described slag discharge system, a installation position of the gasifier is high in order to provide the lock hopper on a lower portion of the gasifier. Accordingly, a height from an installation surface of a plant to the upper of the gasifier increases. If the installation position of the gasifier becomes high, a installation position of a supporting frame for supporting the gasifier, an operating frame, or the like becomes high.

Accordingly, a slag discharge system disclosed in PTL 2 is suggested. In the slag discharge system, a lock hopper is disposed on a side of a gasifier, a slag discharge line communicating from a slag hopper to a lock hopper is provided, a water flow from the slag hopper to the lock hopper is formed in the slag discharge line by a circulation pump, and slag in the slag hopper is discharged to the lock hopper by the water flow.

Accordingly, since the slag can be transferred from the slag hopper to the lock hopper according to the flow of the slag water, the lock hopper can be disposed on the side of the gasifier, and a height from an installation surface of a plant to the upper portion of the gasifier can be suppressed to a low level.

CITATION LIST

Patent Literature

[PTL 1] Japanese Unexamined Patent Application Publication No. 2011-74274
[PTL 2] Japanese Patent No. 5743033

SUMMARY OF INVENTION

Technical Problem

Slag is continuously generated in a gasifier and stored in a lock hopper. If the slag reaches a predetermined storage amount, the slag is discharged from the lock hopper. In the slag discharge system disclosed in PTL 2, the lock hopper is connected to the slag discharge line in series, and it is necessary to stop the circulation pump so as to stop the water flow of the slag discharge line every time slag is discharged.

Accordingly, the circulation pump is operated intermittently, which causes the slag to accumulate in a slag intake during stoppage of the pump, and thus, a blockage (clogging) of the slag discharge line is easily generated.

In addition, a predetermined time is required to discharge the slag from the lock hopper. Accordingly, if the water flow of the slag discharge line is stopped during the predetermined time, the slag water does not pass through a dedicated slag water cooler, and thus, there is a concern that a temperature of the slag water increases.

According to a second embodiment of PTL 2, a bypass line not via the lock hopper is provided. Accordingly, when the slag in the lock hopper is discharged, the water flow system is shut off from the lock hopper, the slag water circulates through slag discharge line during which the water flow system is shut off, and thus, it is possible to continuously operate the circulation pump. However, in this way, it is necessary to increase a capacity of a strainer provided in the slag discharge line.

The present invention is made to solve the above-described problems, and an object thereof is to provide a slag discharge system and a gasifier capable of continuously operating the circulation pump even when the slag of the lock hopper is discharged, preventing the blockage of the intake of the slag discharge line, and preventing an increase of the temperature of the slag water.

Solution to Problem

In order to achieve the above-described object, the present invention adopts the following means.

That is, according to a first aspect of the present invention, there is provided a slag discharge system, including: a slag hopper which is provided in a bottom portion of a gasifier for pyrolyzing and gasifying carbonaceous feedstock, accommodates slag generated from the carbonaceous feedstock, and stores slag water for cooling the slag; a slag discharge line through which a mixture of the slag and the slag water is discharged from the bottom portion of the slag hopper; a slag separation device which is connected to a downstream end of the slag discharge line and separates the slag from the mixture of the slag and the slag water, a circulation pump which forms a water flow from the slag hopper to the slag separation device in the slag discharge line; a lock hopper which stores a predetermined amount of the slag separated by the slag separation device and discharges the predetermined amount of slag out of a system of the gasifier; a slag discharge valve which is provided in a lower outlet of the lock hopper; and a slag water reflux line through which the slag water separated by the slag separation device is returned to the slag hopper.

In the slag discharge system having the above-described configuration, if the circulation pump starts, the water flow from the slag hopper to the slag separation device is formed in the slag discharge line. Accordingly, the mixture of the slag and the slag water stored in the slag hopper is fed to the slag separation device, and the slag is separated from the slag water in the slag separation device. After the separated slag is stored in the lock hopper by a predetermined amount, the slag is discharged out of the system of the gasifier according to the opening of the slag discharge valve. Meanwhile, the slag water separated by the slag separation device is returned to the slag hopper via the slag water reflux line.

According to the above-described configuration, the slag generated in the gasifier is fed to the slag separation device together with the slag water, only the slag separated by the slag separation device is stored in the lock hopper, and the slag water is returned to the slag hopper via the slag water reflux line. That is, the lock hopper is provided in parallel to the slag discharge line or the slag water reflux line. Accordingly, even when the slag is discharged from the lock hopper, it is possible to continuously perform circulation of the slag water through the slag discharge line and the slag water reflux line.

Accordingly, unlike the related art, it is not necessary to stop the water flow of the slag discharge line every time the slag is discharged from the lock hopper. Therefore, a continuous operation can be performed. Accordingly, it is possible to suppress accumulation of the slag in an intake of the slag discharge line inside the slag hopper. Moreover, since the flow of slag water through the slag discharge line or the slag water reflux line does not stagnate, the slag water can always pass through the slag water cooler so as to be cooled, and it is possible to suppress an increase in a temperature of the slag water.

In the above-described configuration, a temporary storage hopper which temporarily stores the slag separated by the slag separation device may be provided between the slag separation device and the lock hopper.

In general, a predetermined time is required so as to discharge the slag of the lock hopper. However, the slag is continuously fed from the slag separation device to the lock hopper side even during which the slag is discharged. Meanwhile, the temporary storage hopper is provided, and thus, it is possible to temporarily accommodate the slag. Therefore, it is possible to discharge the slag of the lock hopper without stopping the operation of the slag separation device, that is, without stopping the flow of the slag water.

In the above-described configuration, the system may further include a bypass line which extends from a height of a shallow portion of the slag water stored in the slag hopper and is joined to the slag water reflux line without going through the slag separation device, and a bypass water flow switching unit which causes the slag water of the slag hopper to selectively flow to the slag discharge line and the bypass line.

According to the above-described configuration, for example, in a case where the slag is accumulated on a bottom portion of the slag hopper and it is difficult to suck the slag water from the intake of the slag discharge line which is open to the bottom portion of the slag hopper, the bypass water flow switching unit is switched, and thus, it is possible to take out the slag water of the shallow portion of the slag hopper from the bypass line.

Accordingly, it is possible to take out the slag water of the shallow portion of the slag hopper which does not contain the slag from the bypass line and feed the slag water to the slag water reflux line. Accordingly, even when the slag is accumulated or even in a case where the slag is not required to be discharged, it is possible to maintain the water flow of the slag water, the slag water always passes through the slag water cooler such that the temperature of the slag water is adjusted, and thus, it is possible to suppress the increase in the temperature of the slag water.

In the above-described configuration having the bypass line, the slag water reflux line may be connected to a reflux nozzle which is provided at the height of the shallow portion of the slag water stored in the slag hopper, and the system may further include a stirring water nozzle which injects the slag water from the bottom portion of the slag hopper toward an intake of the slag discharge line, a stirring water line which branches from the slag water reflux line and is connected to the stirring water nozzle, and a stirring water flow switching unit which causes the slag water returned through the slag water reflux line to selectively flow to the reflux nozzle and the stirring water nozzle.

For example, in a case where the slag is accumulated on the bottom portion of the slag hopper when the circulation pump is stopped and it is difficult to suck the slag water from the intake of the slag discharge line when the pump starts again, if the circulation pump starts as it is, a significant load is applied to an elector motor of the pump. In this case, the bypass water flow switching unit is switched, it is possible to take out the slag water of the shallow portion of the slag hopper from the bypass line, the stirring water flow switching unit is switched such that an outlet of the slag water reflux line is set to the stirring water nozzle, and in this state, the circulation pump starts.

Accordingly, the slag water of the shallow portion of the slag hopper is injected, to the inside of the slag hopper from the stirring water nozzle via the bypass line, the slag water reflux line, and the stirring water line. Therefore, the slag water is supplied from the stirring water nozzle to the slag accumulated on the bottom portion of the slag hopper, and the accumulated slag is stirred and diluted.

Next, the bypass water flow switching unit is switched, and the mixture of the slag stirred on the bottom portion of the slag hopper and the slag water is sucked from the intake of the slag discharge line. In addition, the stirring water flow switching unit is switched, the slag water returned from the slag water reflux line is returned from the reflux nozzle to the slag hopper, and the operation is switched to a normal operation.

In this way, the stirring water nozzle is provided, and thus, it is possible to easily restart the circulation pump even in the case where the slag is accumulated on the bottom portion of the slag hopper. In addition, it is possible to decrease a slag concentration of the slag water taken out from the slag hopper, and thus, it is possible to prevent accumulation or a blockage of slag particles inside each pipe.

In the above-described configuration, the intake of the slag discharge line may be spaced apart above the bottom portion of the slag hopper and may be open vertically downward, and the stirring water nozzle may face the intake in the bottom portion of the slag hopper and may be open vertically upward.

According to the above-described configuration, the slag accumulated on the bottom portion of the slag hopper can be blown upward by the slag water discharged from the stirring water nozzle which is open vertically upward from the bottom portion of the slag hopper, and it is possible to destroy the accumulated state of the slag. Accordingly, it is possible to effectively stir and dilute the slag.

Meanwhile, since the intake of the slag discharge line faces the stirring water nozzle and is open vertically downward, it is possible to favorably take out the slag blown as described above. Accordingly, it is possible to start the slag discharge system without applying a load to the circulation pump even in a state where the slag is accumulated on the bottom portion of the slag hopper.

In the above-described configuration, the stirring water nozzle includes an inner tubular portion which is erected toward the intake of the slag discharge line and includes a closed bottom portion and a plurality of water passages formed on a peripheral of the inner tubular portion, and an outer tubular portion which surrounds the periphery of the inner tubular portion with a space therebetween and injects the slag water from the stirring water line into the inner tubular portion via the water passages.

According to the above-described configuration, first, the slag water supplied from the stirring water line to the stirring water nozzle flows to the inside of the outer tubular portion to surround the vicinity of the inner tubular portion, and next, the slag water flows to the inside of the inner tubular portion all at once via the water passage formed on the peripheral surface of the inner tubular portion. Since the bottom portion of the inner tubular portion is closed, the flow direction of the slag water is changed to the upper side and is blown to the slag hopper side.

Therefore, the slag falling from the slag hopper to the inside of the inner tubular portion is pushed back to the slag hopper side without leaking from the water passage, the slag can be sucked to the intake of the slag discharge line, and thus, it is possible to improve separation performance of the slag.

In the stirring water nozzle having the above-described configuration, the water passage may be formed at a position higher than the lowest portion of the inner tubular portion, another tubular shielding plate may be provided inside the inner tubular portion with a space in a radial direction, a diameter of an upper end portion of the shielding plate gradually increases from the lower side to coincide with a diameter of the inner tubular portion, and a lower end portion of the shielding plate may be spaced apart from a bottom portion of the inner tubular portion to such an extent that the slag falling to the inside of the inner tubular portion does not flow to the outer tubular portion side via the water passage.

According to the above-described configuration, even when the slag falls from the slag hopper to the inside of the shielding plate and is accumulated therein, an angle of repose of the accumulated slag does not affect the water passage of the inner tubular portion. Accordingly, the slag falling from the slag hopper to the inside of the shielding plate is pushed back to the slag hopper side without leaking from the water passage, the slag can be sucked to the intake of the slag discharge line, and thus, it is possible to improve separation performance of the slag.

In the above-described configuration, the system may further include a slag water extraction line through which a portion of the slag water is extracted from the slag water reflux line and is returned to the slag water reflux line via a micro filtration device.

In this way, the slag water extraction line is provided, and thus, fine slag particles which cannot be separated from the slag water by the slag separation device can be removed by the microfiltration device, and it is possible to effectively prevent the fine slag particles from being concentrated and prevent the accumulation or the blockage of the slag particles inside each pipe.

According to a second aspect of the present invention, there is provided a gasifier including the slag discharge system according to any one of the above-described aspects. According to the gasifier, the above-described various operations and effects can be exerted.

Advantageous Effects of Invention

As described above, according to the above-described slag discharge system and gasifier of the present invention, it is possible to continuously operate the pump even when the slag in the lock hopper is discharged, it is possible to prevent the blockage of the slag discharge line, and it is possible to prevent the increase in the temperature of the slag water.

DESCRIPTION OF EMBODIMENTS

Hereinafter, embodiments of the present invention will be described with reference to the drawings.

First Embodiment

Figure 1:
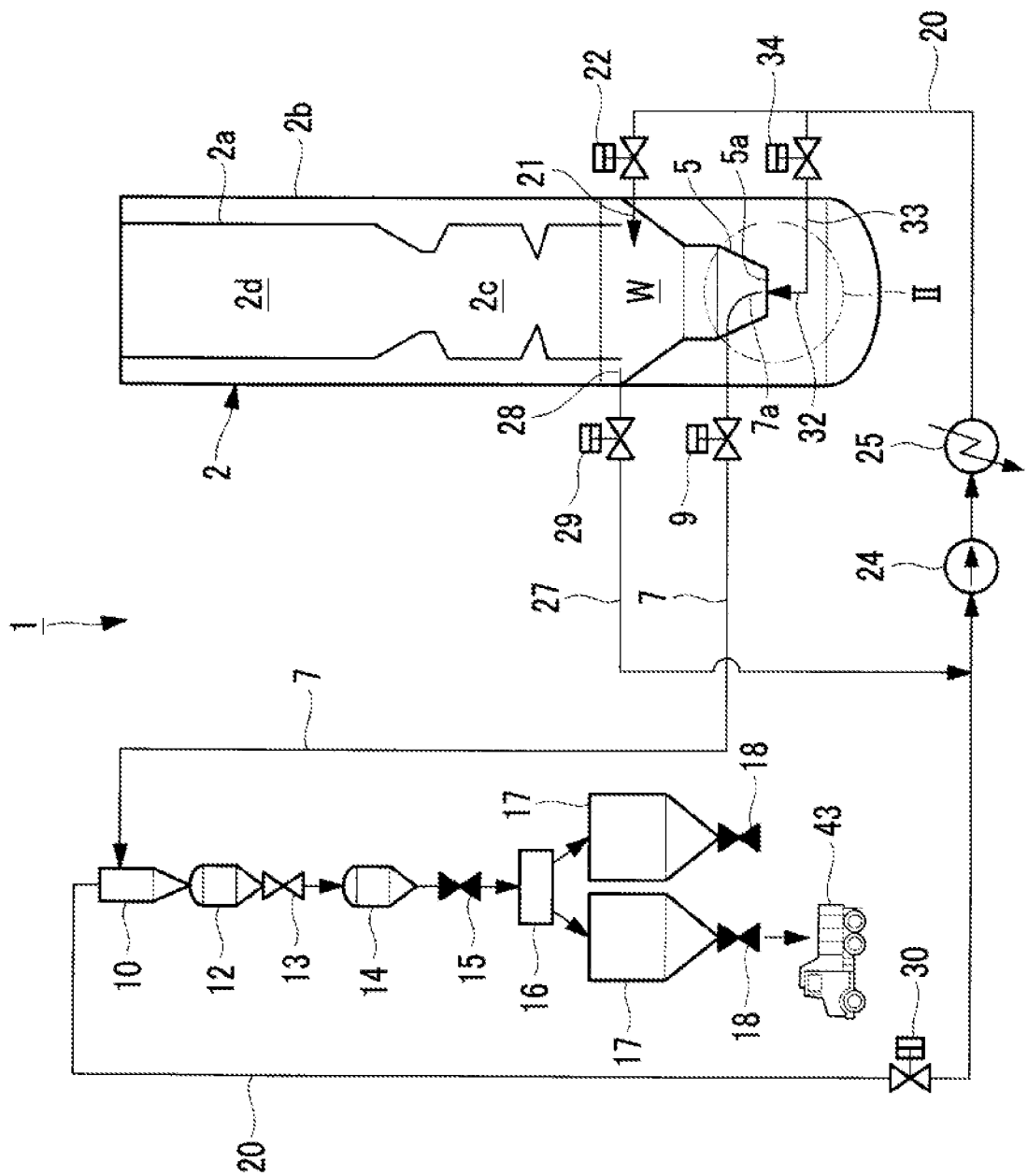
FIG. 1 is a schematic configuration diagram of a slag discharge system showing a first embodiment of the present invention.

FIG. 1 is a schematic configuration diagram of a slag discharge system showing a first embodiment of the present invention. For example, in Integrated Coal Gasification Combined Cycle (IGCC), the slag discharge system 1 is provided in a coal gasifier 2 (gasifier) which puts pulverized coal obtained by pulverizing coal (carbonaceous feedstock) by a mill or the like into a furnace together with a gasifying agent such as air or oxygen to pyrolyze and gasify a mixture thereof. In addition, the gasifier is not limited to the coal gasifier, and the gasifier may be replaced with a gasifier which gasifies other carbonaceous feedstock such as thinned wood, waste wood, driftwood, grasses, waste, sludge, or a biomass fuel of an old tire or like.

For example, the coal gasifier 2 is a pressurized entrained-flow type gasifier and includes an inner container $2a$ and an outer container $2b$ which surrounds the periphery of the inner container $2a$. The inner container $2a$ includes a combustor $2c$ which combusts a portion of the pulverized coal to obtain an amount of heat required for a gasification reaction and a reductor $2d$ which obtains the amount of heat from the combustor $2c$ to gasify the pulverized coal, and the combustor $2c$ and the reductor $2d$ are disposed at two stages vertically.

Figure 2:
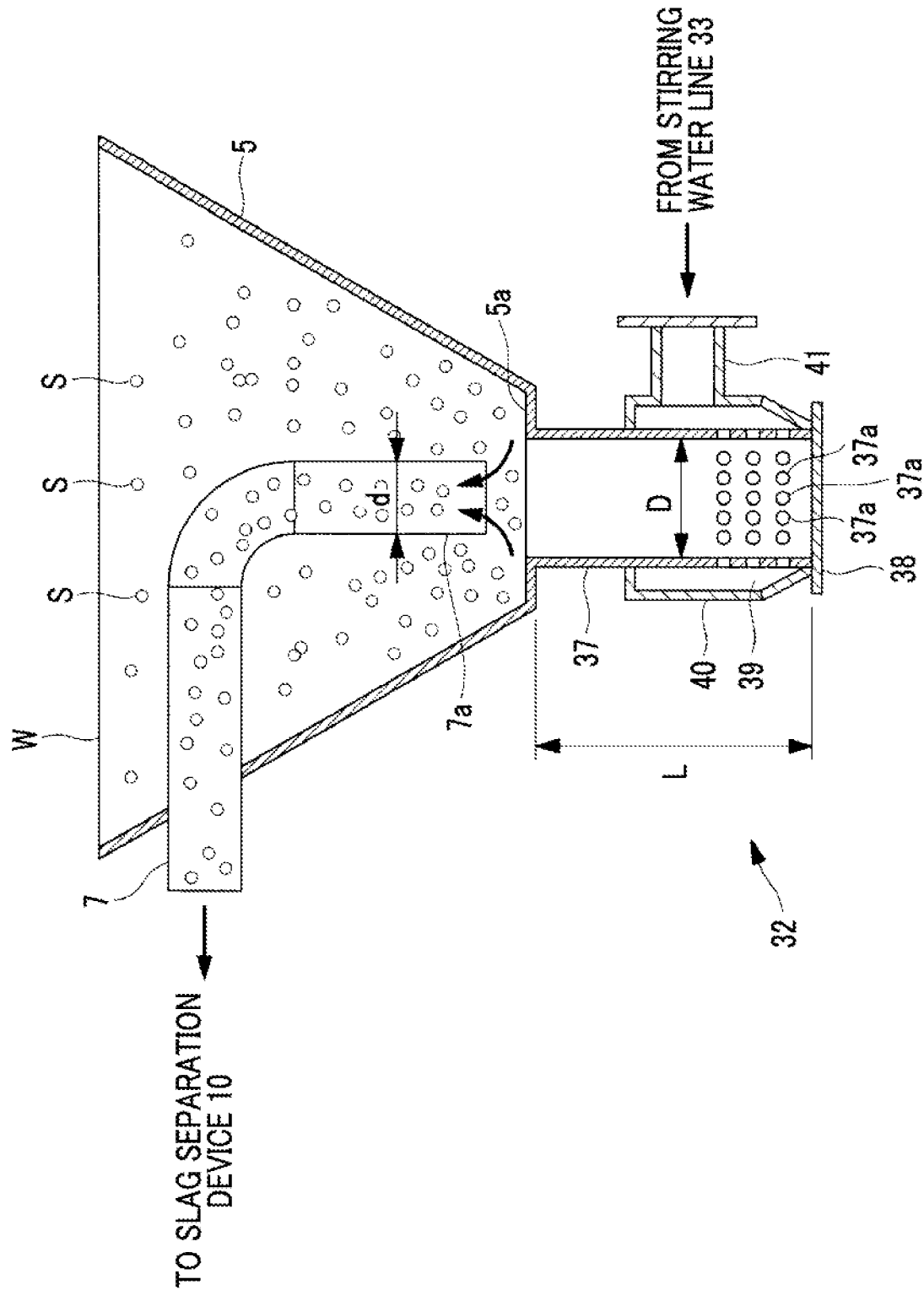
FIG. 2 is a vertical sectional view in the vicinity of the slag hopper in which II portion in FIG. 1 is enlarged.

A slag hopper 5 is provided on a bottom portion of the coal gasifier 2 and slag water W (cooling water) is stored inside the slag hopper 5. As shown in FIG. 2 in an enlarged manner, the slag hopper 5 is a container having a cone shape (conical, pyramid, or the like) which converges downward. After ash in the pulverized coal charged in the coal gasifier 2 is melted by the combustor $2c$, the ash falls, as a liquid molten slag, by the gravity from a slag hole provided in a lower portion of the combustor $2c$ into the slag water W in the slag hopper 5, and the ash is rapidly cooled to be solidified and is crushed, and is discharged out of the system of the coal gasifier 2 by the slag discharge system 1. The slag discharge system 1 is configured as follows.

A slag discharge line 7 is connected to the slag hopper 5. The slag discharge line 7 is a line through which a mixture of a slag S and the slag water W accommodated in the slag hopper 5 is discharged, an upper end of the slag discharge line 7 becomes an intake $7a$, is spaced apart above a bottom portion $5a$ of the slag hopper 5, and is open vertically downward. The mixture of the slag S and the slag water W inside the slag hopper 5 is sucked from the intake 7a. In addition, a slag water intake valve 3 is provided in the slag discharge line 7.

A downstream end of the slag discharge line 7 is connected to a slag separation device 10. The slag separation device 10 separates the slag from the mixture of the slag and the slag water, and for example, preferably, is a centrifugal separation device (cyclone or the like). In addition, a filtration type separation means such as a strainer or a filter may be used. The mixture of the slag and the slag water does not fall by the gravity from the slag hopper 5 so as to be transferred to the slag separation device 10 but is transported by the flow of the water flowing through the slag discharge line 7. Accordingly, the slag separation device 10 can be disposed on the side of the coal gasifier 2, and a height of the coal gasifier 2 can be kept low.

A temporary storage hopper 12, a gate valve 13, a lock hopper 14, a slag discharge valve 15, a slag distributor 16, a plurality of slag dehydrating layers 17 which are installed in parallel, and final discharge valves 18 are connected to the lower portion of the slag separation device 10 in this order. The lock hopper 14 is a hopper in which the slag separated by the slag separation device 10 is stored by a predetermined amount, and the temporary storage hopper 12 is a hopper which temporarily stores the slag S separated by the slag separation device 10 while the slag is discharged to the lock hopper 14.

Meanwhile, one end of a slag water reflux line 20 is connected to the slag separation device 10, and the other end of the slag water reflux line 20 is connected to a reflux nozzle 21 provided in the slag hopper 5. The slag water reflux line 20 is a duct through which the slag water separated by the slag separation device 10 is returned to the slag hopper 5, and a height of the reflux nozzle 21 is set to a height corresponding to that of a shallow portion of the slag water W in the slag hopper 5. In addition, a slag water return valve 22 is provided in the slag water reflux line 20, and a circulation pump 24 and a slag water cooler 25 are connected to the slag water reflux line 20.

By operating the circulation pump 24, the slag water separated by the slag separation device 10 is returned from the reflux nozzle 21 to the inside of the slag hopper 5, and thus, a pressure difference is generated in a connection portion between the intake 7a which is the upstream end of the slag discharge line 7 and the slag separation device 10 which is the downstream end of the slag discharge line 7. Accordingly, a water flow from the slag hopper 5 to the slag separation device 10 is formed in the slag discharge line 7, and the slag S in the slag hopper 5 can be transferred to the slag separation device 10 together with the slag water W.

In addition, a bypass line 27 is disposed, which extends from the slag hopper 5, does not go through the slag separation device 10 (does not pass through the slag discharge line 7), and is joined to an upstream side of the circulation pump 24 in the slag water reflux line 20. The upstream end of the bypass line 27 extends from a bypass intake 28 provided at the height of the shallow portion of the slag water W stored in the slag hopper 5, and a slag water bypass valve 29 is provided in the bypass line 27. The slag water bypass valve 29 and the slag water intake valve 9 which is provided in the slag discharge line 7 configure a bypass water flow switching unit which causes the slag water W of the slag hopper 5 to selectively flow to the slag discharge line 7 and the bypass line 27. In the slag water reflux line 20, a slag water reflux cutoff valve 30 is provided between the slag separation device 10 and a joint portion between the slag separation device 10 and the bypass line 27.

Moreover, a stirring water nozzle 32 is provided in the bottom portion 5a of the slag hopper 5, and a downstream end of a stirring water line 33 branching from a downstream side of the slag water cooler 25 in the slag water reflux line 20 is connected to the stirring water nozzle 32. The stirring water nozzle 32 faces the intake 7a of the slag discharge line 7 in the bottom portion 5a of the slag hopper 5 and is open vertically upward, and is a nozzle which injects the slag water W, which is returned from the slag water reflux line 20 to the slag hopper 5, from the bottom portion of the slag hopper 5 toward the intake 7a of the slag discharge line 7.

A starting slag water valve 34 is provided in the stirring water line 33. The starting slag water valve 34 and the slag water return valve 22 which is provided in the slag water reflux line 20 configure a stirring water flow switching unit which causes the slag water W returned through the slag water reflux line 20 to selectively flow the reflux nozzle 21 and the stirring water nozzle 32.

As shown in FIG. 2, the stirring water nozzle 32 includes an inner tubular portion 37 which is erected toward the intake 7a of the slag discharge line 7 and includes a closed bottom portion and a plurality of water passages 37a formed on a periphery of the inner tubular portion 37, a bottom plate 38 which closes a bottom portion of the inner tubular portion 37, and an outer tubular portion 40 which surrounds the periphery of the inner tubular portion with a space therebetween and forms a jacket chamber 39 between the inner tubular portion 37 and the outer tubular portion 40. A union (flange) 41 to which the stirring water line 33 is connected is provided in the outer tubular portion 40, and a dimeter of a lower portion of the outer tubular portion 40 gradually converges downward and coincides with a diameter of the inner tubular portion 37. In addition, each of the water passages 37a is formed at a position higher than the lowest portion of the inner tubular portion 37.

The slag water supplied via the union 41 from the stirring water line 33 passes through the water passages 37a from the jacket chamber 39 and is injected to the inside of the inner tubular portion 37. The bottom portion of the inner tubular portion 37 is closed, and thus, a flow direction of the slag water is changed to the upper side and the slag water is blown to the slag hopper 5 side.

As shown in FIG. 2, in a case where the diameter of the intake 7a of the slag discharge line 7 is defined as d, a diameter of the stirring water nozzle 32 is defined as D, and an axial length of the inner tubular portion 37 of the stirring water nozzle 32 is defined as L, it is clear from the experiment of the inventors that it is preferable to set D to approximately 0.7 to 2 times d, to set L to approximately 1 to 10 times D.

By setting D to approximately 0.7 to 2 times d, the slag S accumulated on the bottom portion 5a of the slag hopper 5 is efficiently stirred and suspended by the stirring water blown from the inner tubular portion 37, and it is possible to effectively decrease the amount of the slag S around the intake 7a. In addition, by setting L to approximately 1 to 10 times D, the stirring water supplied from the water passages 37a is rectified and can be ejected upward from the inner tubular portion 37.

The slag discharge system 1 having the above-described configuration is operated as follows.

In the slag discharge system 1, if the circulation pump 24 starts, as described above, the water flow from the slag hopper 5 to the slag separation device 10 is formed in the slag discharge line 7. Accordingly, the mixture of the slag S and the slag water W stored in the slag hopper 5 is sucked from the intake 7a to the slag discharge line 7 and is fed to the slag separation device 10, and in the slag separation device 10, the slag is separated from the slag water. After the separated slag is stored in the lock hopper 14 by a predetermined amount via the temporary storage hopper 12 and the gate valve 13, the slag is discharged out of the system of the coal gasifier 2 by opening the slag discharge valve 15.

That is, if the lock hopper 14 is filled with the slag S, the gate valve 13 is closed and a decompression operation of the lock hopper 14 is performed, and thereafter, the slag discharge valve 15 is opened, and the slag S stored in the lock hopper 14 falls into the slag distributor 16 by the gravity. In addition, the slag S is distributed into the plurality of slag dehydrating layers 17 by the slag distributor 16, and finally, is discharged out of the system of the coal gasifier 2 by a transport vehicle 43 or the like. Meanwhile, the slag which is continuously fed from the slag separation device 10 is temporarily stored in the temporary storage hopper 12, and the gate valve 13 is opened when the discharge of the slag of the lock hopper 14 is completed, and thus, the slag falls into the lock hopper 14. Meanwhile, the slag water separated by the slag separation device 10 is returned to the slag hopper 5 via the slag water reflux line 20.

According to the above-described configuration, the slag S generated in the coal gasifier 2 is fed to the slag separation device together with the slag water W, only the slag separated by the slag separation device 10 is stored in the lock hopper 14, and the slag water is returned to the slag hopper 5 via the slag water reflux line 20. That is, the lock hopper 14 is provided in parallel to the slag discharge line 7 or the slag water reflux line 20. Accordingly, even when the slag is discharged from the lock hopper 14, it is possible to continuously perform the circulation of the slag water through the slag discharge line 7 and the slag water reflux line 20.

Accordingly, unlike the related art, it is not necessary to stop the water flow of the slag discharge line 7 every time the slag is discharged from the lock hopper 14. Therefore, a continuous operation can be performed. Accordingly, it is possible to suppress accumulation of the slag in the intake 7a of the slag discharge line 7 inside the slag hopper 5. Moreover, since the flow of slag water through the slag discharge line 7 or the slag water reflux line 20 does not stagnate, the slag water can always pass through the slag water cooler 25 so as to be cooled, and it is possible to suppress an increase in a temperature of the slag water.

In the slag discharge system 1, as described above, the temporary storage hopper 12 which temporarily stores the slag is provided above the lock hopper 14 which is provided in parallel to the slag discharge line 7 or the slag water reflux line 20.

In general, a predetermined time is required so as to discharge the slag of the lock hopper 14. However, the slag is continuously fed from the slag separation device 10 to the lock hopper 14 side even during which the slag is discharged. Meanwhile, the temporary storage hopper 12 is provided, and thus, it is possible to temporarily accommodate the slag. Therefore, it is possible to discharge the slag of the lock hopper 14 without stopping the operation of the slag separation device 10, that is, without stopping the flow of the slag water.

For example, when the slag discharge system 1 starts, if the slag S is accumulated on the bottom portion of the slag hopper 5, it is difficult to suck the slag water W from the intake 7a of the slag discharge line 7. In this case, the slag water intake valve 9 and the slag water bypass valve 29 which are the bypass water flow switching unit are switched with each other, and thus, the slag water of the shallow portion of the slag hopper 5 is taken out from the bypass line 27. That is, the slag water intake valve 9 is closed, the slag water bypass valve 29 is opened, and in this state, the circulation pump 24 starts. The slag water reflux cutoff valve 30 may be closed instated of the slag water intake valve 9 being closed.

Accordingly, it is possible to take out the slag water W of the shallow portion of the slag hopper 5 which does not contain the slag S from the bypass line 27 and feed the slag water S to the slag water reflux line 20. Therefore, even when the slag S is accumulated or even in a case where the slag S is not required to be discharged, it is possible to maintain the water flow of the slag water W, the slag water W always passes through the slag water cooler 25 such that the temperature of the slag water W is adjusted, and thus, it is possible to suppress the increase in the temperature of the slag water.

In addition, for example, in a case where the slag S is accumulated on the bottom portion of the slag hopper 5 when the circulation pump 24 is stopped and it is difficult to suck the slag water W from the intake 7a of the slag discharge line 7 when the pump starts again, as described above, the bypass water flow switching unit (valves 9 and 29) is switched, it is possible to take out the slag water W of the shallow portion of the slag hopper 5 from the bypass line 27, and the slag water return valve 22 and the starting slag water valve 34 which are the stirring water flow switching unit are switched with each other. That is, the slag water return valve 22 is closed, the starting slag water valve 34 is opened, the outlet of the slag water reflux line 20 is set to the stirring water nozzle 32, and in this state, the circulation pump 24 starts.

Accordingly, the slag water of the shallow portion of the slag hopper 5 is injected to the inside of the slag hopper 5 from the stirring water nozzle 32 via the bypass line 27, the slag water reflux line 20, and the stirring water line 33. Therefore, the slag water W is supplied from the stirring water nozzle 32 to the slag S accumulated on the bottom portion of the slag hopper 5, and the accumulated slag S is stirred and diluted.

Next, the bypass water flow switching unit is switched, that is, the slag water intake valve 9 is opened and the slag water bypass valve 29 is closed. Accordingly, the mixture of the slag S stirred on the bottom portion of the slag hopper 5 and the slag water W is sucked from the intake 7a of the slag discharge line 7. In addition, the stirring water flow switching unit is switched, that is, the slag water return valve 22 is opened and the starting slag water valve 34 is closed. Accordingly, the slag water W returned from the slag water reflux line 20 is returned from the reflux nozzle 21 to the slag hopper 5, and the operation is switched to a normal operation.

In this way, the stirring water nozzle 32 is provided, and thus, it is possible to easily restart the circulation pump 24 even in the case where the slag S is accumulated on the bottom portion of the slag hopper 5. In addition, it is possible to decrease a slag concentration of the slag water W taken out from the slag hopper 5, and thus, it is possible to prevent accumulation or a blockage of slag particles inside each of the pipes 7, 20, 27, and 30.

In the slag discharge system 1, the intake 7a of the slag discharge line 7 is spaced apart above the bottom portion 5a of the slag hopper 5 and is open vertically downward, and the stirring water nozzle 32 faces the intake 7a in the bottom portion 5a of the slag hopper 5 and is open vertically upward.

According to the above-described configuration, the slag S accumulated on the bottom portion of the slag hopper 5 can be blown upward by the slag water W discharged from the stirring water nozzle 32 which is open vertically upward from the bottom portion of the slag hopper 5, and it is possible to destroy the accumulated state of the slag. Accordingly, it is possible to effectively stir and dilute the slag S.

Meanwhile, since the intake 7a of the slag discharge line 7 faces the stirring water nozzle 32 and is open vertically downward, it is possible to favorably take out the slag S blown as described above. Accordingly, it is possible to easily start the slag discharge system 1 even in a state where the slag S is accumulated on the bottom portion of the slag hopper 5.

In addition, in the slag discharge system 1, the stirring water nozzle 32 includes the inner tubular portion 37 which is erected toward the intake 7a of the slag discharge line 7 and includes a closed bottom portion and the plurality of porous water passages 37a formed along the circumferential direction on the peripheral surface of the inner tubular portion 37, a bottom plate 38 which closes a bottom portion of the inner tubular portion 37, and the outer tubular portion 40 which surrounds the periphery of the inner tubular portion 37 with a space therebetween and injects the slag water W from the stirring water line 33 into the inner tubular portion 37 via the water passages 37a.

According to the above-described configuration, first, the slag water W supplied from the stirring water line 33 to the stirring water nozzle 32 flows to the inside of the outer tubular portion 40 to surround the periphery of the inner tubular portion 37, and next, the slag water W flows to the inside of the inner tubular portion 37 all at once via the water passage 37a formed on the peripheral surface of the inner tubular portion 37. Since the bottom portion of the inner tubular portion 37 is closed, the flow direction of the slag water W is changed to the upper side and is blown to the slag hopper 5 side.

Therefore, the slag S falling from the slag hopper 5 to the inside of the inner tubular portion 37 is pushed back to the slag hopper 5 side without leaking from the water passages 37a, the slag S can be sucked to the intake 7a of the slag discharge line 7, and thus, it is possible to improve separation performance of the slag S.

Second Embodiment

Figure 3:
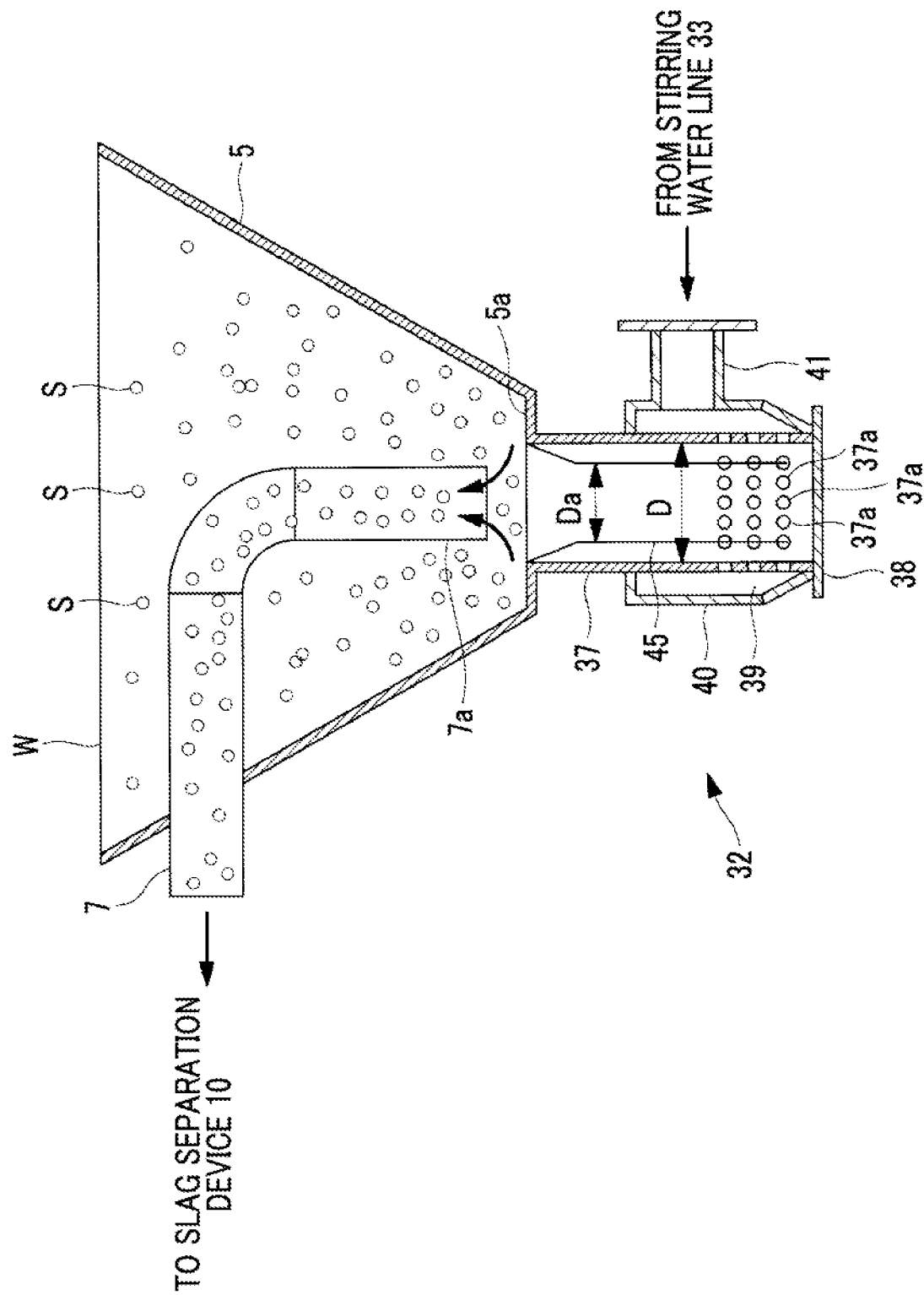
FIG. 3 is a vertical sectional view in the vicinity of the slag hopper showing a second embodiment of the present invention.

FIG. 3 is a vertical sectional view in the vicinity of the slag hopper 5 showing a second embodiment of the present invention. A configuration in FIG. 3 is different from the configuration of the first embodiment shown in FIG. 2 in that another tubular shielding plate 45 is provided inside the inner tubular portion 37 of the stirring water nozzle 32 with a space in a radial direction. Configurations of other portions are similar to those of the first embodiment, the same reference numerals are assigned to the portions, and descriptions thereof are omitted.

A diameter of an upper end portion of another tubular shielding plate 45 provided inside the inner tubular portion 37 gradually increases and coincides with the diameter of the inner tubular portion 37. In addition, the lower end portion of the shielding plate 45 is spaced apart from the bottom portion (bottom plate 38) of the inner tubular portion 37 to such an extent that the slag S falling to the inside of the inner tubular portion 37 does not flow to the outer tubular portion 40 side via the water passage 37a. It is preferable that a diameter Da of the shielding plate 45 is set to approximately 0.5 to 0.9 times the diameter D of the stirring water nozzle 32.

According to the above-described configuration, even when the slag S falls from the slag hopper 5 to the inside of the shielding plate 45 and is accumulated therein, an angle of repose of the accumulated slag S does not affect the water passage 37a of the inner tubular portion 37. Accordingly, the slag S falling to the inside of the shielding plate 45 by the flow of the water flowing into the inner tubular portion 37 via the water passage 37a from the outer peripheral side of the inner tubular portion 37 according to the starting of the circulation pump 24 is pushed back to the slag hopper 5 side without leaking to the outside from the water passage 37a, and the slag S can be sucked to the intake 7a of the slag discharge line 7. Accordingly, it is possible to improve separation performance of the slag S.

Third Embodiment

Figure 4:
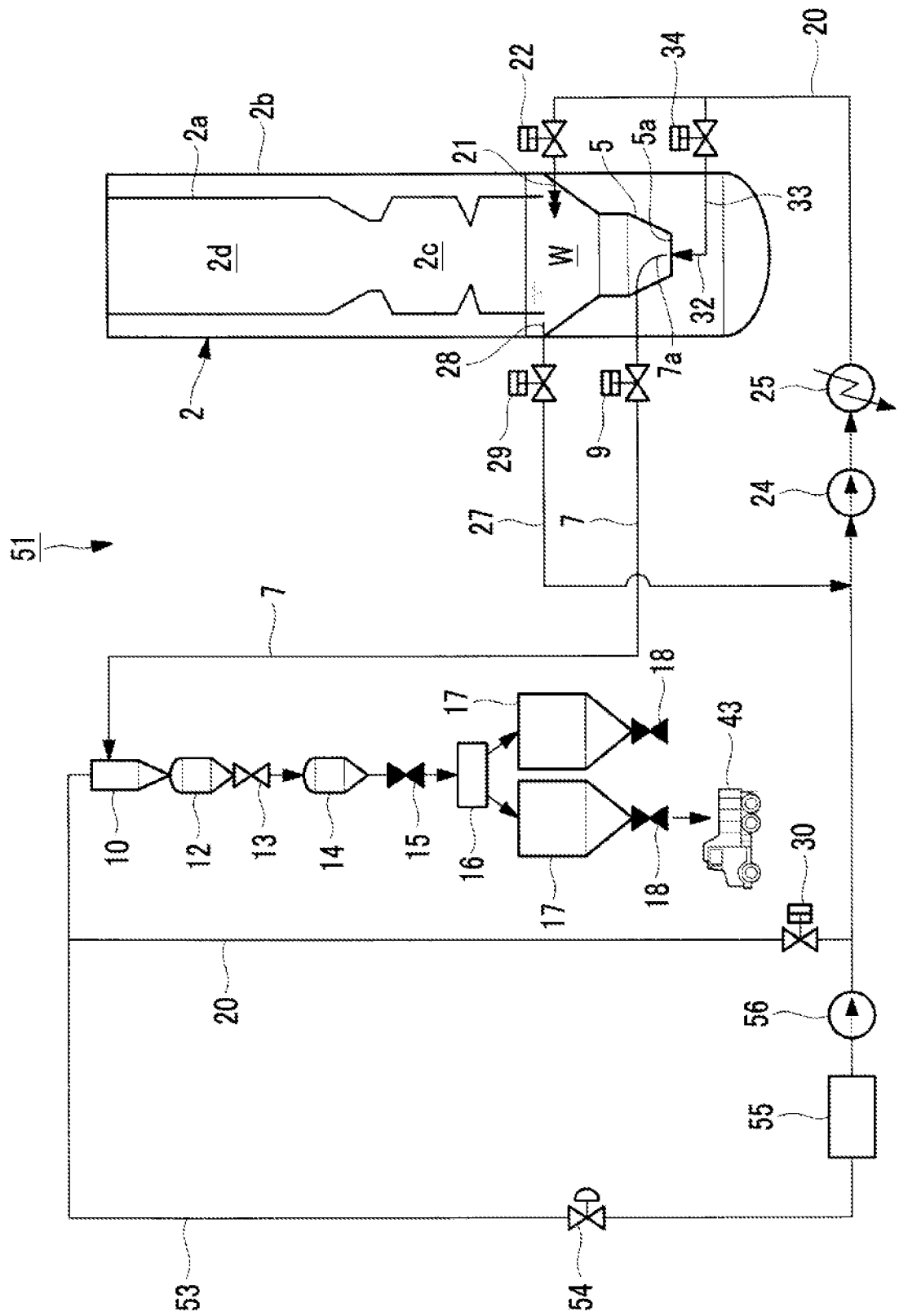
FIG. 4 is a schematic configuration diagram of a slag discharge system showing a third embodiment of the present invention.

FIG. 4 is a schematic configuration diagram of a slag discharge system showing a third embodiment of the present invention. A slag discharge system 51 is different from the slag discharge system 1 in that a slag water extraction line 53 through which a portion of the slag water W is extracted from the slag water reflux line 20 is provided, and other portions are similar to those of the first embodiment. Accordingly, the same reference numerals are assigned to the same portions, and descriptions thereof are omitted.

For example, the slag water extraction line 53 branched from the slag water reflux line 20 which becomes a downstream side of the slag separation device 10 and is rejoined to the slag water reflux line 20 on a downstream side of the slag water reflux cutoff valve 30 connected to the slag water reflux line 20. For example, a flow control valve 54, a microfiltration device 55, and a water supply pump 56 are connected to the slag water extraction line 53 in this order from the upstream side of the flow. As the microfiltration device 55, a membrane filter can be exemplified. However, the present invention is not limited this.

In this way, the slag water extraction line 53 is provided, and thus, fine slag particles which cannot be separated from the slag water by the slag separation device 10 can be removed by the microfiltration device 55, and it is possible to effectively prevent the fine slag particles from being concentrated and prevent the accumulation or the blockage of the slag particles inside each pipe.

As described above, according to the slag discharge systems 1 and 51 according to the embodiments and the coal gasifier 2 having the slag discharge systems 1 and 51, it is possible to continuously operate the circulation pump 24 even when the slag is discharged from the lock hopper 14, it is possible to prevent the blockage of the intake 7a of the slag discharge line 7, it is possible to decrease the load of the circulation pump 24, and it is possible to prevent the increase in the temperature of the slag water.

In addition, the present invention is not limited only to the configurations of the above-described embodiments, the present invention can be appropriately modified or improved, and embodiments to which the modification and improvement are added are also included in the scope of rights of the present invention.

REFERENCE SIGNS LIST 1, 51: slag discharge, system
2: coal gasifier (gasifier)

5: slag hopper
7: slag discharge line
7a: intake of slag discharge line
9: slag water intake valve (bypass water flow switching unit)
10: slag separation device
12: temporary storage hopper
14: lock hopper
15: slag discharge valve
20: slag water reflux line
21: reflux nozzle
22: slag water return valve (stirring water flow switching unit)
24: circulation pump
27: bypass line
29: slag water bypass valve (bypass water flow switching unit)
32: stirring water nozzle
33: stirring water line
34: starting slag water valve (stirring water flow switching unit)
37: inner tubular portion
37a: water passage
40: outer tubular portion
45: shielding plate
53: slag water extraction line
55: microfiltration device
56: water supply pump
S: slag
W: slag water

The invention claimed is:

1. A slag discharge system, comprising:
a slag hopper which is provided in a bottom portion of a gasifier for pyrolyzing and gasifying carbonaceous feedstock, accommodates slag generated from the carbonaceous feedstock, and stores slag water for cooling the slag;
a slag discharge line through which a mixture of the slag and the slag water is discharged from the bottom portion of the slag hopper;
a slag separation device which is connected to a downstream end of the slag discharge line and separates the slag from the mixture of the slag and the slag water,
a circulation pump which forms a water flow from the slag hopper to the slag separation device in the slag discharge line;
a lock hopper which stores a predetermined amount of the slag separated by the slag separation device and discharges the predetermined amount of slag out of a system of the gasifier;
a slag discharge valve which is provided in a lower outlet of the lock hopper;
a gate valve which is provided in an upper inlet of the lock hopper;
a slag water reflux line through which the slag water separated by the slag separation device is returned to the slag hopper,
a bypass line which extends from a height of a shallow portion of the slag water stored in the slag hopper and is joined to the slag water reflux line without going through the slag separation device; and
a bypass water flow switching unit which causes the slag water of the slag hopper to selectively flow to the slag discharge line and the bypass line,
wherein the slag water reflux line is connected to a reflux nozzle which is provided at the height of the shallow portion of the slag water stored in the slag hopper,
the system further comprising:
a stirring water nozzle which injects the slag water from the bottom portion of the slag hopper toward an intake of the slag discharge line;
a stirring water line which branches from the slag water reflux line and is connected to the stirring water nozzle; and
a stirring water flow switching unit which causes the slag water returned through the slag water reflux line to selectively flow to the reflux nozzle and the stirring water nozzle,
wherein the intake of the slag discharge line is spaced apart above the bottom portion of the slag hopper and is open vertically downward, and
wherein the stirring water nozzle faces the intake in the bottom portion of the slag hopper and is open vertically upward.

2. The slag discharge system according to claim 1, further comprising:
a temporary storage hopper which is provided between the slag separation device and the lock hopper and temporarily stores the slag which is separated by the slag separation device.

3. The slag discharge system according to claim 1, wherein the stirring water nozzle includes
an inner tubular portion which is erected toward the intake of the slag discharge line and includes a closed bottom portion and a plurality of water passages formed on a periphery of the inner tubular portion, and
an outer tubular portion which surrounds the periphery of the inner tubular portion with a space therebetween and injects the slag water from the stirring water line into the inner tubular portion via the water passages.

4. The slag discharge system according to claim 1, wherein in the stirring water nozzle, another tubular shielding plate is provided inside the inner tubular portion with a space in a radial direction,
wherein a diameter of an upper end portion of the shielding plate gradually increases from the lower side to coincide with a diameter of the inner tubular portion, and
wherein a lower end portion of the shielding plate is spaced apart from a bottom portion of the inner tubular portion to such an extent that the slag falling to the inside of the inner tubular portion does not flow to the outer tubular portion side via the water passage.

5. The slag discharge system according to claim 1, further comprising:
a slag water extraction line through which a portion of the slag water is extracted from the slag water reflux line and is returned to the slag water reflux line via a microfiltration device.

6. A gasifier comprising: the slag discharge system according to claim 1.

* * * * *